United States Patent [19]

Kumagai

[11] 4,292,112
[45] Sep. 29, 1981

[54] TIRE BUILDING DRUM

[75] Inventor: Yuzo Kumagai, Kodaira, Japan

[73] Assignee: Bridgestone Tire Company Limited, Tokyo, Japan

[21] Appl. No.: 116,662

[22] Filed: Jan. 29, 1980

[30] Foreign Application Priority Data

Feb. 1, 1979 [JP] Japan .................. 54/011069

[51] Int. Cl.³ ............................................ B29H 17/16
[52] U.S. Cl. ..................................... 156/415; 156/417
[58] Field of Search ............... 156/414, 415, 417, 418, 156/419, 420

[56] References Cited

U.S. PATENT DOCUMENTS

| | | | |
|---|---|---|---|
| 2,614,057 | 10/1952 | Ericson et al. | 156/420 |
| 2,824,336 | 2/1958 | Weigold et al. | 156/416 |
| 3,346,434 | 10/1967 | Fulton | 156/417 |
| 3,909,337 | 9/1975 | Yabe | 156/416 |
| 3,929,546 | 12/1975 | Katagili et al. | 156/417 |

*Primary Examiner*—John E. Kittle
*Attorney, Agent, or Firm*—Cushman, Darby & Cushman

[57] ABSTRACT

A tire building drum can readily and reliably be adjusted in drum width, and comprises; a plurality of arcuate base segments radially expansible to collectively define a cylindrical shape; a pair of arcuate side flanges mounted on each of the arcuate base segments in opposing and spaced relation with each other to be axially slidable toward and away from each other; and an arcuate spacer section mounted on each of the arcuate base segments between the arcuate side flanges to form a cylindrical outer surface and a certain drum width of the tire building drum, the arcuate spacer section being hooked to the arcuate side flanges so as to be readily detached from and attached to the arcuate side flanges.

2 Claims, 3 Drawing Figures

TIRE BUILDING DRUM

FIELD OF THE INVENTION

The present invention relates to a tire building drum which has a drum width designed to be adjusted readily and reliably.

BACKGROUND OF THE INVENTION

In building tires, the drum width of the tire building drum is an essential factor for deciding tire sizes. In order to build a number of tires different in size by only one tire building machine, it is required to adjust the drum width. For this adjustment of the drum width, there have been provided a wide variety of apparatus one of which comprises a plurality of arcuate base segments radially expansible to collectively define a cylindrical shape; a pair of arcuate side flanges mounted on each of the arcuate base segments in opposing and spaced relation with each other to be axially slidable toward and away from each other; and an arcuate spacer section mounted on each of the arcuate base segments between the arcuate side flanges to form a cylindrical outer surface and a certain drum width of the tire building drum. The conventional tire building drum can be collapsed when the tire is removed from the tire building drum after it has been built thereon. The spacer section of the conventional tire building drum is in zigzag engagement with the opposing side flanges to be arranged at a widthwisely central position. Within each of the side flanges is formed a T-shape cross-sectioned and axially extending slot in which is received a head portion of a bolt having a stem portion extended throughout the side flange and the base segment to be screwed with a nut. In this way, the spacer section and the side flanges are secured to the base segment. The nut is however positioned internally of the base segment so that it is extremely difficul to screw the nut with the stem portion of the bolt within the base segment since there are many parts such as links, a rotary shaft and the like within the base segments. The axial movement of the side flange can not be smoothly effected since the head portion of the bolt is engaged with the axially extending slot to prevent the side flange from smoothly being moved. In addition, the screwing operation of the nut within the base segment is time consuming and over-screwing of the nut causes the slot to be broken and deformed, thereby further preventing the smooth movement of the side flange.

SUMMARY OF THE INVENTION

It is therefore a primary object of the present invention to provide a tire building drum which can readily and reliably be changed in drum width in comparison with the conventional tire building drum.

It is another object of the present invention to provide a tire building drum which allows the side flanges to be smoothly moved.

In order to attain the above objects, the tire building drum according to the present invention comprises in combination: a plurality of arcuate base segments radially expansible to collectively define a cylindrical shape; a pair of arcuate side flanges mounted on each of the arcuate base segments in opposing and spaced relation with each other to be axially slidable toward and away from each other; and an arcuate spacer section mounted on each of the arcuate base segments between the arcuate side flanges to form a cylindrical outer surface and a certain drum width of the tire building drum, the arcuate spacer section being hooked to the arcuate side flanges so as to be readily detached and attached to the arcuate side flanges.

BRIEF DESCRIPTION OF THE DRAWINGS

The above and other objects, features and advantages of the present invention will become clear from the following particular description of the invention and the appended claims, taken in conjunction with the accompanying drawings which show by way of example a preferred embodiment of the present invention.

In the accompanying drawings.

Figure 1:
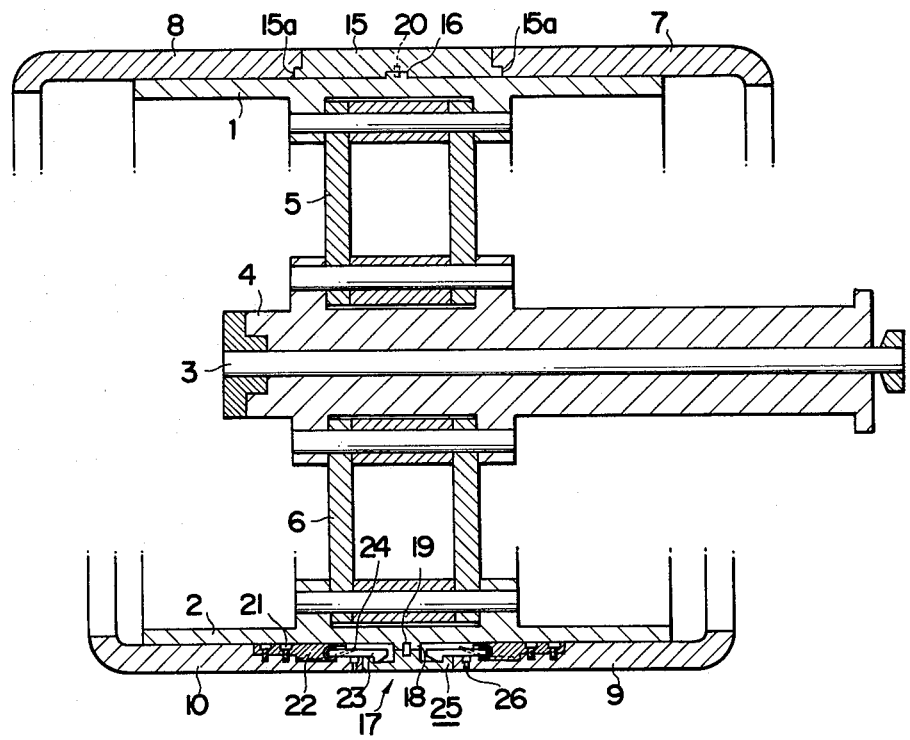
FIG. 1 is a cross-sectional view of a tire building drum embodying the present invention and showing at an upper half a wider drum width of the tire building drum and at a lower half a narrower drum width of the tire building drum.
Figure 2:
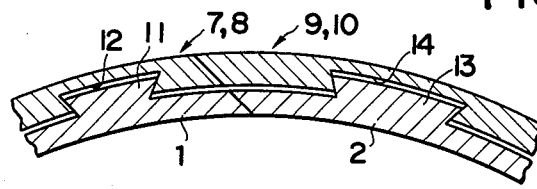
FIG. 2 is a cross-sectional view cross-sectioned fragmentarily and circumferentially of the tire building drum.
Figure 3:
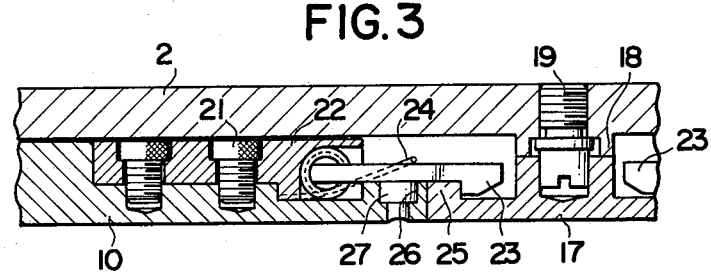
FIG. 3 is an enlarged cross-sectional view of parts around a hook which serves to attach and detach an arcuate spacer section to and from arcuate side flanges on an arcuate base segment.

Referring now to the drawings and in particular to FIGS. 1 and 2, there is shown a tire building drum of the present invention which comprises a plurality of arcuate base segments 1 and 2 which are arranged alternatively in a circumferential direction and radially expansible to collectively define a cylindrical base drum. The base segment 1 is connected through links 5 with a sleeve 4, which is rotated together with a rotary shaft 3, as shown in an upper half of FIG. 1 while the base segment 2 is connected through links 6 with the sleeve 4 as shown in a lower half of FIG. 1 so that the base segment 1 may be radially inwardly moved before the base segment 2 is radially inwardly moved when the tire building drum is collapsed. The base segments 1 and 2 are therefore designed to be overlapped in the collapsed state of the tire building drum. As shown in the upper half of FIG. 1, a pair of arcuate side flanges 7 and 8 are mounted on each of the base segments 1 in opposing and spaced relation with each other to be axially slidable toward and away from each other. As shown in the lower half of FIG. 1, a pair of arcuate side flanges 9 and 10 are similarly mounted on each of the base segments 2 in opposing and spaced relation with each other to be axially slidable toward and away from each other. As best shown in FIG. 2, there is formed on the outer face of the base segment 1 a dove tail projection 11 which is in engagement with a dove tail groove 12 formed in each of the side flanges 7 and 8. It is therefore to be understood that the dove tail projection 11 and the dove tail groove 12 permit the pair of side flanges 7 and 8 to be axially slidable on the base segment 1. In a similar fashion, there is formed on the outer face of the base segment 2 a dove tail projection 13 which is in engagement with a dove tail groove 14 formed each of the side flanges 9 and 10, with the result that the dove tail projection 13 and the dove tail groove 14 permit the pair of side flanges 9 and 10 to be axially slidable on the base segment 2. Between the side flanges 7 and 8 is provided an arcuate spacer section 15 which is in engagement with a circumferentially extending protrusion 16 formed on the base segment 1 so that the spacer section 15 is disposed at a widthwisely central position to collectively form a cylindrical outer surface and a certain drum width of the tire building drum according to the present invention together with the side flanges 7, 8, 9, 10 and another spacer section which will become apparent as the description proceeds. In a similar manner, another arcuate spacer section 17 is provided between the side flanges 9 and 10 to be in engagement with another circumferentially extending protrusion 18 formed on the base segment 2 so that the spacer section 17 is disposed at a widthwisely central position to collectively form a cylindrical outer surface and a certain drum width of the tire building drum together with the foregoing spacer section 15, the side flanges 7, 8, 9 and 10. In order to prevent the side flanges 7, 8, 9 and 10 from being removed from the base segments 1 and 2, stop members not shown are respectively provided between the side flanges 7, 8 and the base segment 1, and between the side flanges 9, 10 and the base segment 2. As best shown in the upper half of FIG. 1, the spacer section 15 is retained at both axial ends 15a by the side flanges 7 and 8 not so as to be removed radially outwardly. Also, the spacer section 17 is retained at both axial ends by the side flanges 9 and 10. The spacer section 17 is positioned by a positioning pin 19 secured to the base segment 2 for preventing the spacer section 17 from being circumferentially and axially moved as shown in FIG. 3 and the lower half of FIG. 1. Similarly, the spacer section 15 is positioned by a positioning pin 20 secured to the base segment 1 for preventing the spacer section 15 from being circumferentially and axially moved as shown in the upper half of FIG. 1.

With reference to FIG. 3, there is shown a hook 23 which is pivotally connected with an attaching plate 22 screwed as at 21 to the inner peripheral surface of each of the side flanges 9 and 10 in the vicinity of the spacer section 17. The hook 23 is locked by a coil spring 24 to a projection 25 inwardly projected from axial one end of the spacer 17 in such a way that the hook 23 is resiliently urged radially outwardly by the coil spring 24 which has one end engaged with the attaching plate 22 and the other end engaged with the longitudinally intermediate portion of the hook 23. The hook 23 is unlocked by a hook removing pin 27 from the projection 25 in such a way that the hook removing pin 27 is inserted into a radial bore formed in each of the side flanges 9 and 10 in the vicinity of the projection 25 of the spacer section 17 and pushed radially inwardly to move the hook 23 away from the projection 25 against the coil spring 24. Within each of the side flanges 7 and 8 is provided another hook which is locked to and unlocked from the spacer section 15 in a similar manner but not shown in the upper half of FIG. 1.

The operation of the tire building drum thus constructed above will now be described hereinlater to change the tire building drum from its small width as shown in the lower half of FIG. 1 to its large width as shown in the upper half of FIG. 1.

Firstly, the hook removing pins 27 are radially inwardly pushed against the coil springs 24 to disengage the hooks 23 from the projections 25 formed on both axial ends of the spacer section 17, and the side flanges 9 and 10 are moved away from each other while the hook removing pins 27 are being radially inwardly pushed. The spacer section 17 can therefore readily be removed from the base segment 2 since the spacer section 17 is only engaged with the protrusion 18 and the positioning pin 19. Secondly, another spacer section 15 which is larger in width than the spacer section 17 is mounted on the base segment 2 in place of the spacer section 17, and then the side flanges 9 and 10 are moved toward each other to automatically lock the spacer section 15 to the base segment 2 when the side flanges 9 and 10 are brought into engagement with the spacer section 15 by permitting the hooks 23 to be engaged with the projections of the spacer section 15. At this time, it is easily confirmed whether or not the hooks 23 are brought into engagement with the projections of the spacer section 15 by watching whether or not the hook removing pins 27 are returned to their predetermined positions adjacent to the outer surface of the side flanges 9 and 10. In this way, all the wider spacer sections 15 are changed for the narrower spacer sections 17 between the side flanges 9 and 10 on the base segmanets 2, and similarly all the wider spacer sections are changed for the narrower spacer sections between the side flanges 7 and 8 on the base segment 1 to complete the predetermined drum width of the tire building drum.

As has been described above, the drum width of the tire building drum according to the present invention can readily and reliably be changed as compared with that of the conventional tire building drum since the interconnection of the side flanges, the spacer sections and the base segments can be also readily and reliably effected. Further, the side flanges can be smoothly axially moved, and the time required for adjusting the drum width becomes extremely short.

Although particular embodiments of the present invention have been shown and described, it will be obvious to those skilled in the art various changes and modifications may be made without departing from the spirit and scope of the present invention.

What is claimed is:
1. A tire building drum, comprising in combination:
   a plurality of arcuate base segments radially expansible to collectively define a cylindrical shape;
   a pair of arcuate side flanges mounted on each of said arcuate base segments in opposing and spaced relation with each other to be axially slidable toward and away from each other;
   an arcuate spacer section mounted on each of said arcuate base segments between said arcuate side flanges to form a cylindrical outer surface and a certain drum width of the tire building drum;
   a positioning pin secured to said arcuate base segments for positioning said spacer section on said arcuate base segments;
   a hook engaging said arcuate said flanges and said arcuate spacer section;
   a spring resiliently urging said hook to engage said arcuate side flanges and said arcuate spacer section; and
   a hook removing pin insertable into the tire building drum so as to disengage said arcuate side flanges from said arcuate spacer section.
2. A tire building drum as set forth in claim 1, in which:
   said hook, said spring and said hook removing pin are positioned in the radially inner sides of each of said arcuate side flanges.

* * * * *